United States Patent [19]

Panzer

[11] 4,414,663
[45] Nov. 8, 1983

[54] TIME DIVISION MULTIPLEX SYSTEM HAVING TRANSMITTED PULSES IN TIME CHANNELS DISTRIBUTED OVER AND CO-TRANSMITTED WITH A FRAME CLOCK SIGNAL COMPONENT

[75] Inventor: Klaus Panzer, Munich, Fed. Rep. of Germany

[73] Assignee: Siemens Aktiengesellschaft, Berlin & Munich, Fed. Rep. of Germany

[21] Appl. No.: 204,207

[22] Filed: Nov. 5, 1980

[30] Foreign Application Priority Data

Nov. 27, 1979 [DE] Fed. Rep. of Germany ....... 2947770

[51] Int. Cl.³ .............................................. H04J 3/06
[52] U.S. Cl. ................................ 370/100; 370/110.4; 375/110
[58] Field of Search ..................... 370/4, 10, 100, 101, 370/110.4; 375/110, 111, 113; 340/825.14

[56] References Cited

U.S. PATENT DOCUMENTS 3,402,264  9/1968  Ellis et al. ............................ 375/110
3,898,388  8/1975  Goodwin ............................. 370/100
4,054,754 10/1977  Nicodemus et al. ................. 370/100

OTHER PUBLICATIONS

Kato, D., "High-Quality Broad-Band Optical Communication by Time-Division Multiplexed Pulse Analog Modulation: Nonlinearity in Diode Lasers," IEEE Journal of Quantum Electronics, vol. QE-14, No. 5, May 1978, pp. 343-346.

Primary Examiner—Gerald L. Brigance
Attorney, Agent, or Firm—Hill, Van Santen, Steadman & Simpson

[57] ABSTRACT

In a time division multiplex system having chronological grouping of optically transmittable PPM signals, the PPM signals of one half of the time channels are transmitted as pulses in one half of each pulse frame and the PPM signals of the other half of the time channels are transmitted as pulse pauses in the other half of each frame for the purpose of the co-transmission of a clock frequency component without providing a separate synchro time slot. For this purpose, PPM pulses are formed and transmitted only in one pulse frame half, while PPM pulses formed in the other pulse frame half are subtracted from a continuous signal corresponding in amplitude to the pulse amplitude, and the signal difference is transmitted. At the receiver, the frame clock component is filtered out by a band-pass filters and is exploited for controlling a receiving clock generator.

3 Claims, 4 Drawing Figures

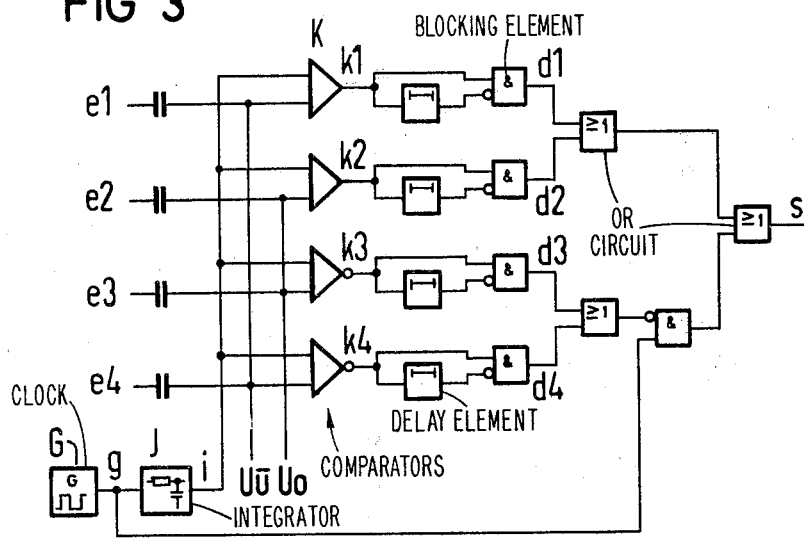
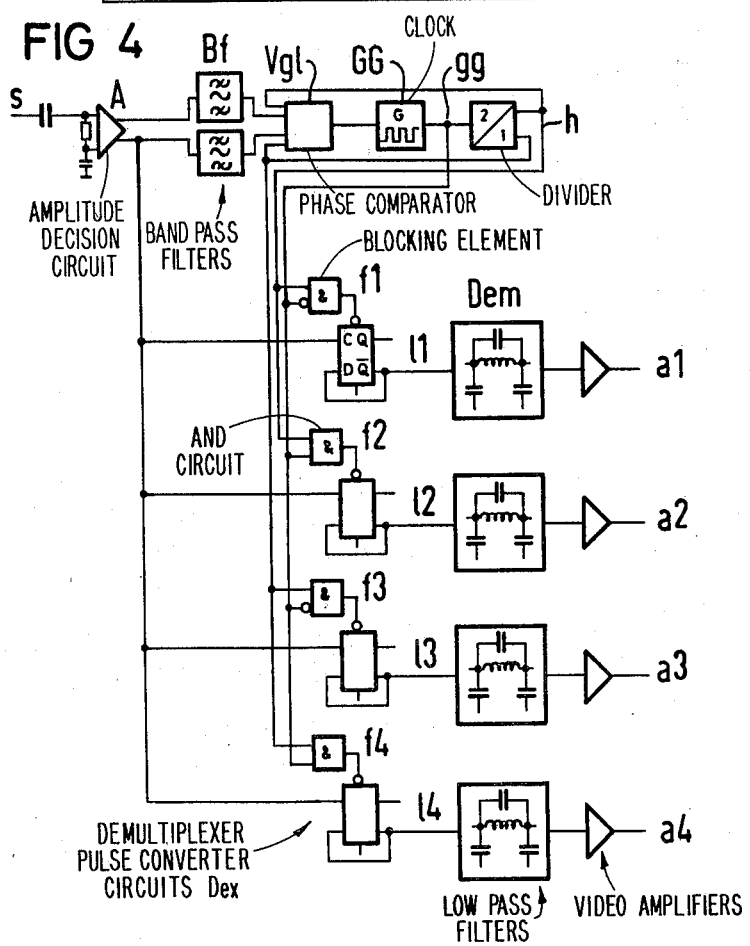

TIME DIVISION MULTIPLEX SYSTEM HAVING TRANSMITTED PULSES IN TIME CHANNELS DISTRIBUTED OVER AND CO-TRANSMITTED WITH A FRAME CLOCK SIGNAL COMPONENT

BACKGROUND OF THE INVENTION

1. Field of the Invention

The present invention relates to a time division multiplex system having time division multiplexing of pulse-modulated signals comprising pulses of identical shape and width, particularly of optically transmittable pulse phase modulated (PPM) signals.

2. Description of the Prior Art

In such time division multiplex systems, the individual pulse-modulated signals are transmitted in time slots respectively assigned to time channels with the respectively identical chronological position in so-called multiplex frames constantly following one another. In order to guarantee synchronism between devices of the time division multiplex system of the transmission side and on the receiving side, the temporal position of each frame and the temporal position of the individual time slots therein must be clearly defined.

To this end, the beginning of each frame, or of at least each, for example second pulse frame can be defined by means of transmitting a frame identification signal and, proceeding therefrom, one can then derive the temporal position of the subsequent time slots. Such a frame identification signal can be provided, for example, by a frame identification pulse provided at the beginning of the frame, the frame identification pulse being broader than the remaining pulses of the pulse frame and, therefore, being distinguishable from the latter. Such a frame identification, however, uses a corresponding time period of the pulse frame and, moreover, requires a corresponding expense in evaluation.

The expense is even greater when a special pilot tone or a so-called frame identification word is transmitted at the beginning of a frame, the pilot tone or frame identification word then being identified at the receiving side by a corresponding search circuit.

SUMMARY OF THE INVENTION

In contrast to the foregoing, the invention provides a technique for avoiding frame identification signals, but nonetheless making an information available at the receiving side by way of the chronological position of the frame and, to be derived therefrom, of the individual time slots. To this end, given a time division multiplex system of the type briefly mentioned above, in a respective portion of each frame, the signals of the appertaining portion of the time channels are transmitted as pulses and, in another portion of each frame, the signals of another portion of the time channels are transmitted as pulse pauses.

The invention, which can preferably be employed in the multiplex transmission of a plurality of video signals to a subscriber of a broad band communication network, having subscriber lines formed by light wave guides, offers the advantage, without a separate synchro time slot being necessary, of an implicit frame clock frequency component contained in the transmitted signal mixture which is relatively strong and therefore, is relatively easy to evaluate at the receiving side for defining the chronological position of the frame and, to be derived therefrom, the individual time slots. Further, the invention offers the advantage that, given equality of the number of pulses and pulse pauses in a frame, the direct current mean value of the transmitted signal mixture is practically identical to half the pulse amplitude, which makes possible a correspondingly simple realization of an amplitude decision threshold to be provided at the receiving side. Under certain conditions a simple, capacitive connection of an amplitude decision element suffices. It is advantageous that, in a further development of the invention, PPM pulses are formed and transmitted on the transmitting side only in the one half of each pulse frame, in the appertaining one half of the time channels whereas, in the other half of each pulse frame, PPM pulses formed in the other half of the time channels are subtracted from a continuous signal corresponding in amplitude to the pulse amplitude and the signal difference is transmitted. This makes possible a correspondingly simple generation and combination of pulses and pulse pauses to form the signal mixture to be transmitted.

It is advantageous for regaining the original signal from the signal mixture that, in a further development of the invention, pulses and pulse pauses arrive for demodulation on the receiving side at channel-specific low-pass filters by way of demultiplexer pulse converter circuits which are controlled by a clock generator regulated with the frame clock component contained in the transmitted signal mixture.

It should be pointed out that a time division multiplexing of optically transmittable PPM signals is fundamentally known, for example, from the IEEE Journal of Quantum Electronics, QE-14 (1978) 5, pp. 343-346; however, problems of a frame synchronization are not dealt with in this article.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a schematic illustration of a modulator and multiplexer circuit on the transmitting side of a time division multiplex system constructed in accordance with the present invention; and FIG. 4 is a schematic illustration of a demultiplexer and demodulator circuit on the receiving side of a time division multiplex system constructed in accordance with the present invention.

DESCRIPTION OF THE PREFERRED EMBODIMENTS

Figure 1:
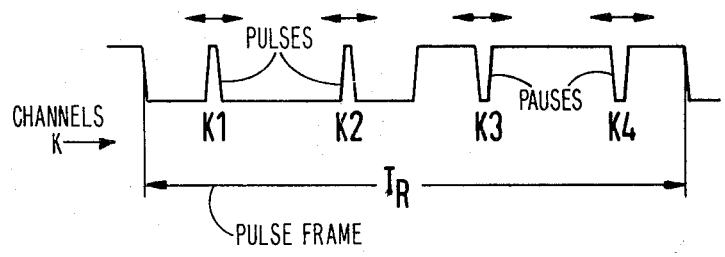
FIG. 1 is an illustration of the position of PPM pulses and pulse pauses in a time division multiplex frame of a time division multiplex system constructed and operated in accordance with the present invention.

Referring to FIG. 1, a schematic illustration provides an exemplary embodiment of a pulse frame $T_R$ of a time division multiplex system constructed and operated in accordance with the present invention. In the example of FIG. 1, the pulse frame $T_R$ encompasses four time slots respectively forming a time channel K1, K2, K3, K4 together with the corresponding time slots of preceding and following pulse frames, in which time slots it is assumed that a respective PPM pulse-shaped signal can be transmitted. Thereby, respectively in the one half of each pulse frame $T_R$, the signals of one half K1, K2 of the time channels K1–K4 are transmitted as pulses and, in the other half of each pulse frame $T_R$, the signals of the other half K3, K4 of the time channels K1–K4 are transmitted as pulse pauses. To a certain degree, the pulse pauses thereby form the difference between a continuous signal, as is indicated in FIG. 2, line g, which exists in the second half of each pulse frame $T_R$ and corresponds in amplitude to the pulse amplitude and pulses subtracted therefrom and, therefore, underlying the pulse pauses, as will be described in greater detail below.

Figure 2:
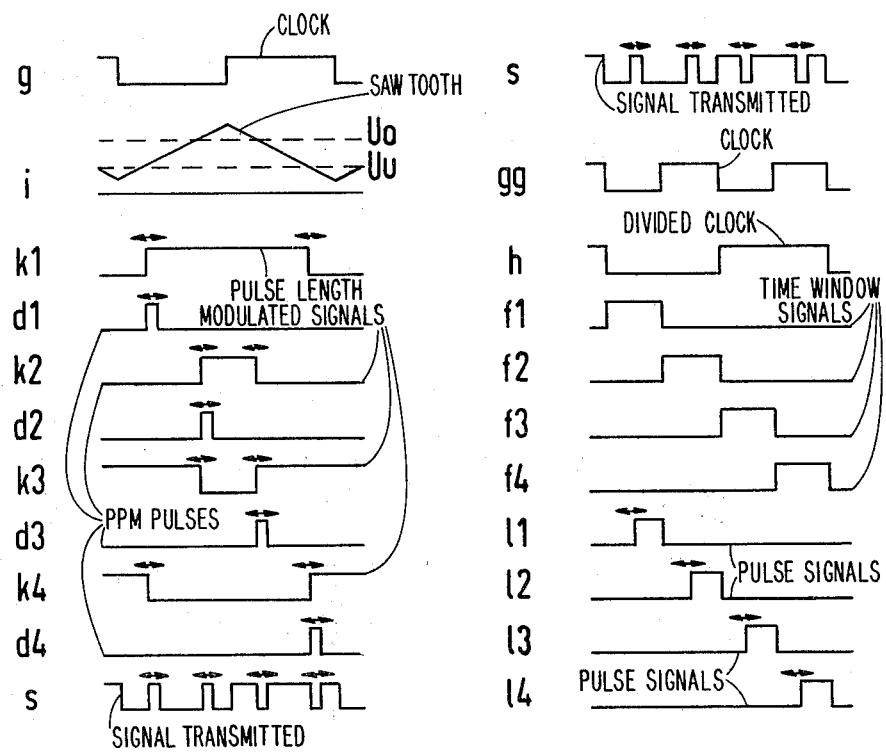
FIG. 2 is a signal chart illustrating the operating modes or, respectively, signal courses occurring in a time division multiplex system constructed in accordance with the present invention, in particular with reference to an exemplary embodiment illustrated in FIG. 3 and with reference to an exemplary embodiment illustrated in FIG. 4.

As can be seen from FIG. 1, the frame clock frequency component, as can also be seen from FIG. 2, line g, is very clearly contained in the signal mix transmitted in this manner, so that a regaining of the frae clock is correspondingly facilitated without, for example, a separate frame identification signal being transmitted in its own time channel.

The formation of the PPM pulses to be transmitted in the one pulse frame half and of PPM pulse pauses to be transmitted in the other frame half and corresponding to further such pulses can occur with the circuit arrangement as is illustrated in FIG. 3. In the pulse phase modulator and multiplexer circuit of FIG. 3, a sawtooth signal, as indicated in FIG. 2, line i, is derived by way of an integrator circuit J from a pulse frame clock, as is illustrated in FIG. 2, line g, generated by a clock generator G at its output g. By way of the integrator output line i, the sawtooth signal arrives at an input of channel-specific comparators K which, for example, can be realized by AMD voltage comparators Am685, the comparators lying at an offset voltage $U_u$ or, respectively, $U_o$ with their respectively other input, as is likewise indicated in FIG. 2, line i.

The comparators K are charged with the respective, modulating signals received on channel-specific inputs e1, e2, e3, e4. The appertaining comparator is then respectively activated as long as the sum of the modulating signal and the offset voltage exceeds the instantaneous value of the sawtooth voltage. The pulse length modulated signals on the comparator output lines k1, k2, k3, k4 arising therefrom (for example, for the instantaneous value zero of the respective modulating signal) are illustrated in FIG. 2, lines k1, k2, k3 and k4. With the assistance of differentiating circuits formed according to FIG. 3, for example, by means of a delay element and a blocking element, from such signals one obtains PPM pulses, as are illustrated in FIG. 2, in lines d1, d2, d3 and d4, on the output lines d1, d2, d3 and d4.

The pulses (cf. FIG. 2, d1 and d2) to be transmitted in the first half of the pulse frame and the pulses (cf. FIG. 2, d3 and d4) being relevant in the second half of the pulse frame are respectively combined in and of themselves, for example, by way of an OR circuit, whereupon the former pulses to be transmitted in the first half of the pulse frame arrive, for example by way of a further OR circuit, on a signal line s carrying the signal mixture to be transmitted, as is indicated in FIG. 2, in line s. The remaining pulses for transmission in the second half of the pulse frame are subtracted, for example, by means of a blocking element, from the frame clock signal (FIG. 2, line g) generated by the clock generator G, whereupon the remaining differential signal likewise arrives on the signal line s carrying the signal mixture to be transmitted, as is indicated in FIG. 2, line s. Thereby, the signal line s, without being additionally illustrated in FIG. 3, can lead to an electro-optical transmission stage having a laser diode, proceeding from which the signal mixture consisting of PPM pulses and pulse pauses is optically relayed for instance via a light wave guide connecting a broad band switching center to a subscriber terminal in a broad band communication network.

For regaining the frame clock on the receiving side from the transmitted signal mixture, the latter, as can be seen from FIG. 4, can arrive from an opto-electrical receiving stage (not illustrated in FIG. 4) to a capacitively coupled amplitude decision circuit A via a line s then carrying the signal mixture according to FIG. 2, line s. The amplitude decision circuit A can likewise be provided by an AMD voltage comparator Am685. The amplitude decision circuit regenerates the received pulses and pulse pauses, namely without a special measurement of the pulse amplitudes and a corresponding followup of the decision threshold. The frame clock component is filtered out of the regenerated signal mixture as well as out of the signal complementary thereto by a respective band pass filter Bf and both signals are supplied to a phase comparator Vgl realized, for example, with the assistance of a Siemens mixer S 042, the phase comparator Vgl being further loaded with a frame clock generated by a clock generator circuit GG, divided 2:1, in turn controlled by the phase comparator, so that the frame clock is synchronized with the frame clock contained in the transmitted signal mixture. Thereby, the clock generator circuit comprises a clock generator GG which generates a clock on its output line gg with a clock frequency which is equal to twice the frame clock frequency, as is illustrated in FIG. 2, line gg. A binary divider 2/1 carrying the frame clock, as is illustrated in FIG. 2, line h, on its output line h is connected to the output of the clock generator GG, the binary divider connected on its output side to the input side of the comparator Vgl, if need be, by way of a low-pass circuit (not illustrated in FIG. 4).

Linkage circuits, for example, in the form of a respective AND circuit, or, respectively, of a blocking element, are connected to the output lines gg and h of the clock generator circuit and receive the clock signals according to FIG. 2, line gg and FIG. 2, line h, synchronized with respect to the transmission clock, so that the time window signals, as illustrated in FIG. 2, lines f1–f4, corresponding to the individual time channels occur at the outputs f1, f2, f3 and f4. These time window signals are supplied to unlatching inputs of pulse phase modulation, pulse length modulation pulse converters which are realized, for example, with the assistance of Motorola Master-Slave D Flip-Flops MC1670, the PPM/PLM pulse converters being charged on their input sides with the transmitted and regenerated signal mixture and which are then respectively switched on only for the pulse occurring in the respective time window or, respectively, for the pulse pause occurring in the time window. In FIG. 4, the linkage circuits generating the time window signals and the PPM/PLM pulse converters respectively unlatched at the proper time have a common reference character Dex. By way of the time channel-specific demultiplexer/pulse converter circuits Dex, the pulses, or respectively, pulse pauses, in the form of which can be seen in FIG. 2, lines 11, 12, 13 and 14, arrive at low-pass filters Dem advantageously exhibiting an attenuation peak at the clock frequency, in which low-pass filters Dem the original modulation signals are regained and which may then respectively lead, by way of a following video amplifier, to the channel-specific outputs a1, a2, a3 and a4.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a time division multiplex system having time division multiplexing of pulse modulated signals comprising pulses of identical shape and width, particularly of optically transmittable pulse phase modulation signals, the improvement therein comprising:
    means for transmitting in a first half of each pulse frame, as defined by a frame clock, signals of a first portion of the time channels of a frame as pulses; and
    means for transmitting in a second half of each pulse frame the signals of another portion of the time channels as pulse-shaped pauses within a signal level which corresponds to that of the signals transmitted in the first half of the pulse frame, so that a clock component is co-transmitted superimposed with said pulses without requiring a separate sync channel.

2. The improved time division multiplex system of claim 1, wherein:
    said means for transmitting pulses comprises means for forming pulse phase modulated pulses for the first half of the time channels of each pulse frame; and said means for transmitting pulse-shaped pauses comprises means providing a signal level corresponding to the signal level of the signals transmitted in the first half of the pulse frame and means for subtracting pulse phase modulated pulses from said signal level.

3. The improved time division multiplex system of claim 1, on the receiving side, further comprising:
    channel-specific low-pass filters for demodulating the pulses and pulse-shaped pauses;
    demultiplexer/pulse converter circuits connected to said low-pass filters; and
    a clock generator connected to receive the clock component, the pulses and pulse-shaped pauses and operable to recover a frame clock component from the clock component and connected to control said demultiplexer/pulse converter circuits.

* * * * *